United States Patent
Ohnesorge et al.

(10) Patent No.: US 8,079,580 B2
(45) Date of Patent: Dec. 20, 2011

(54) MAINTAINING DEVICE FOR A RIM OF A VEHICLE WHEEL

(75) Inventors: Axel Ohnesorge, Burgwedel (DE); Hans-Joachim Wronski, Lehrte (DE)

(73) Assignee: Horst Warkotsch, Burgwedel (DE)

(*) Notice: Subject to any disclaimer, the term of this patent is extended or adjusted under 35 U.S.C. 154(b) by 675 days.

(21) Appl. No.: 12/097,650

(22) PCT Filed: Apr. 24, 2006

(86) PCT No.: PCT/EP2006/003731
§ 371 (c)(1),
(2), (4) Date: Nov. 10, 2008

(87) PCT Pub. No.: WO2007/073779
PCT Pub. Date: Jul. 5, 2007

(65) Prior Publication Data
US 2009/0278295 A1    Nov. 12, 2009

(30) Foreign Application Priority Data

Dec. 16, 2005  (DE) .......... 10 2005 060 765
Jan. 23, 2006  (DE) .......... 10 2006 003 329
Feb. 7, 2006   (DE) .......... 10 2006 005 790

(51) Int. Cl.
*B23Q 1/64* (2006.01)
(52) U.S. Cl. .............. 269/57; 269/55; 73/487
(58) Field of Classification Search ............. 269/55, 269/57; 73/487
See application file for complete search history.

(56) References Cited

U.S. PATENT DOCUMENTS

| | | | | |
|---|---|---|---|---|
| 3,995,498 A * | 12/1976 | Curchod et al. | .......... | 73/480 |
| 4,070,915 A * | 1/1978 | Caroff | .......... | 73/487 |
| 4,167,118 A | 9/1979 | Hihara | | |
| 4,530,239 A * | 7/1985 | Scarinci | .......... | 73/455 |
| 6,991,059 B2 * | 1/2006 | Stubbe | .......... | 180/253 |

FOREIGN PATENT DOCUMENTS

| | | |
|---|---|---|
| DE | 1 195 071 | 6/1965 |
| DE | 26 19 618 A1 | 11/1976 |
| DE | 28 16 183 A1 | 10/1979 |
| DE | 44 26 325 A1 | 3/1995 |

OTHER PUBLICATIONS

International Search Report for International Application No. PCT/EP2006/003731.

* cited by examiner

*Primary Examiner* — Lee D Wilson
*Assistant Examiner* — Shantese McDonald
(74) *Attorney, Agent, or Firm* — Roberts Mlotkowski Safran & Cole, P.C.; David S. Safran

(57) ABSTRACT

A holding device for a rim of a vehicle wheel having a base plate which has a central recess for being pushed onto the shaft of a balancing machine, having a plurality of rotatably mounted holding elements and having at least one coupling element which is arranged coaxially with respect to the central recess and is mounted rotatably on the base plate, the holding elements and the coupling element having an interacting coupling for the positive coupling of the rotational movement of the holding elements. There is provision, in addition to the coupling which bring about the positive connection, for the holding elements and the coupling element to have a further coupling mechanism for the frictional coupling of the rotational movement of the holding elements, and for at least one fixing device to be provided for fixing the holding elements, if required.

30 Claims, 3 Drawing Sheets

MAINTAINING DEVICE FOR A RIM OF A VEHICLE WHEEL

BACKGROUND OF THE INVENTION

1. Field of Invention

The invention relates to a holding device for a rim of a vehicle wheel, preferably for pressing the rim onto a bearing flange of a shaft of a balancing machine, said holding device having a base plate which has a central recess for being pushed onto the shaft of the balancing machine, having a plurality of rotatably mounted holding elements, which are arranged preferably at a uniform mutual circumferential spacing and preferably at a uniform radial spacing from the central recess, and having at least one coupling element which is arranged coaxially with respect to the central recess and is mounted rotatably on the base plate, the holding elements and the coupling element having interacting coupling means for the positive coupling of the rotational movement of the holding elements, and each holding element having a holding means which is preferably mounted eccentrically.

2. Description of Related Art

U.S. Pat. No. 4,167,118 has already disclosed an apparatus having a base plate which has a central recess for being pushed onto the shaft of a balancing machine, having a plurality of rotatably mounted holding elements and having at least one coupling element which is arranged coaxially with respect to the central recess and is mounted rotatably on the base plate, the holding elements and the coupling element having interacting coupling means for the positive coupling of the rotational movement of the holding elements, and each holding element having a holding means for the rim of a vehicle wheel. For the positive coupling of the rotational movement of the holding elements, the known apparatus has, in each case, coupling pins on the rotatably mounted holding elements, which coupling pins engage in each case into radial slots of a coupling element of annular configuration which is arranged on a base plate and can be rotated about the axis of a central recess in the base plate. By rotation of the coupling element, the coupling pins are driven and therefore the holding elements are rotated about their rotational axis. During rotation of the holding elements, the radial spacing of pressure pins which are mounted eccentrically on the holding elements changes with respect to the axis of the central recess of the base plate, and the mutual circumferential spacing of the pressure pins also changes. As a result, it is possible to adapt the radial spacing of the pressure pins of the central recess and the mutual circumferential spacing of the pressure pins as a function of the pitch circle diameter of fastening holes of a rim of a vehicle wheel which is to be balanced.

While the known apparatus is being pushed onto a shaft of a balancing machine and being pressed onto the rim of the vehicle wheel, the pressure pins engage on the end side into fastening holes of the rim, with the result that the rim is pressed firmly against the bearing flange during clamping of the apparatus against the bearing flange of the balancing machine. Since the clamping forces are transmitted to the fastening holes of the rim only by the ends of the pressure pins, no other parts of the surface of the rim can be damaged by the pressure pins, which is advantageous not only in the case of painted steel rims, but also, in particular, in the case of rims made from anodized lightweight metal, for example aluminum.

It is a disadvantage of the apparatus which is known from U.S. Pat. No. 4,167,118 that the positive coupling of the rotational movement of the holding elements is not possible without play on account of tolerances during manufacture. This has the consequence that exact maintenance of the mutual circumferential spacing of the pressure pins and also of their radial position with respect to the shaft of a balancing machine is not ensured, with the result that unbalance errors which lead to faulty balancing of the vehicle wheel can occur during the balancing operation as a result of the known apparatus.

U.S. Pat. No. 4,070,915 has disclosed a holding device for a rim of a vehicle wheel, in which holding device the rim is fastened directly to the device. The known device has a base plate with a plurality of holding elements, which are arranged at a uniform mutual circumferential spacing and at a uniform radial spacing from a central recess of the base plate and are mounted on the base plate, each holding element having an eccentrically mounted threaded bolt for fastening the rim to the device. A gearwheel which is arranged coaxially with respect to the central recess of the base plate and is mounted rotatably on the base plate is provided for the positive coupling of the rotational movement of the holding elements. The gearwheel is toothed in sections on its circumferential face, the toothed sections of the gearwheel meshing with toothed sections of the holding elements. It is possible by rotation of the gearwheel to adjust the radial spacing of the threaded bolts from the central recess of the base plate and to adjust the mutual circumferential spacing of the threaded bolts. The known device likewise has the disadvantage that the transmission of the movement between the meshing toothing sections is not possible without play. This in turn has the consequence that exact maintenance of the mutual circumferential spacings of the threaded bolts and also of their radial position with respect to the shaft of the balancing machine is not ensured, with the result that unbalance errors can occur during the balancing operation as a result of the device.

German Patent Application DE 26 19 618 A1 has disclosed a wheel holder for a wheel balancing or a tire changing machine having a carrier plate which is mounted rotatably and serves to receive a rim of a wheel. Satellite gears are mounted rotatably on the carrier plate at a uniform radial spacing from the rotational axis of the carrier plate, a central gear group being provided for coupling the rotational movement of the satellite gears. The central gear group meshes with all the satellite gears. If one of the satellite gears is rotated, wheel fastening bolts which are arranged eccentrically on the satellite gears are displaced via the central gear group to circles which are concentric with respect to the rotational axis of the carrier plate. A force can be exerted on the central gear group, by which force the central group is spread radially with respect to the rotational axis of the carrier plate, in order to bring its teeth into full engagement with the teeth of the satellite gears. It is possible as a result to reduce the play between the teeth of the central gear group and the teeth of the satellite gears, without impairing the rotational movement of the gearwheels. However, the known wheel holder is of structurally complicated design, which increases the expenditure for assembly and the manufacturing costs. Otherwise, it has been shown in practice that the exertion of force on the central gear group can lead to the teeth of the central gear group jamming between the teeth of the satellite gears. A rotational movement of the gearwheels is then no longer possible.

German Patent DE-C 1 195 071 has disclosed a device for clamping vehicle wheels in a centered manner on a disk which is mounted rotatably on a carrying axle by way of planetary gears which are carried by said disk. Carrying bolts which are mounted eccentrically on the planetary gears are provided for fastening to the rim. The planetary gears can be adjusted by a sun gear which is arranged on the carrying axle, the sun gear being configured as a friction wheel which drives the planetary gears. The carrying bolts can be adjusted uniformly by rotation of the sun gear, the relatively constant spacing of the carrying bolts being maintained substantially and the annular ring diameter changing uniformly for all carrying bolts. Here, each planetary gear is rotated independently of the other planetary gears until the carrying bolt which is influenced by it has reached an alignment end position. As a result, the known device is intended to ensure that the wheel to be tested is held by all carrying bolts in the precise alignment position with respect to the balancing axis of the balancing machine. The above-described device has the disadvantage that the frictional coupling of the rotational movement of the holding elements is associated with increased wear, which leads to it being necessary for the sun gear to be replaced at short time intervals in the known device. This contributes to high maintenance costs of the known device. In addition, slipping of the planetary gears can occur, which can lead to undesired displacement of the carrying bolts.

SUMMARY OF THE INVENTION

It is an object of the present invention to provide a holding device of the type which is described in the introduction, by way of which holding device the coupled adjustment of the holding elements is possible largely without play and in a simple manner.

The abovementioned object is achieved in a clamping device of the type which is mentioned in the introduction by the fact that, in addition to the coupling means which bring about the positive connection, the holding elements and the coupling element have further coupling means for the frictional coupling of the rotational movement of the holding elements, and by the fact that at least one fixing device is provided for fixing the holding elements if required.

The basic concept of the invention comprises reducing or even largely eliminating the play in the coupling of the rotational movement of the holding elements by further coupling means for a frictional coupling being provided in addition to the positive coupling of the elements. This ensures that unbalance errors cannot occur in the device according to the invention, which unbalance errors occur in the prior art as a consequence of the comparatively large play between the coupling means which are provided for the positive coupling. At the same time, the positive coupling makes it possible to transmit sufficiently high adjusting forces which are required for the coupled rotation of the holding means. According to the invention, the combined frictional and positive coupling of the rotational movement of the holding elements provides a particularly reliable possibility for adjusting the holding elements, which has very little play.

Moreover, according to the invention, a fixing device is provided for fixing the holding elements if required. After the holding means have been set to a defined pitch circle diameter of the rim of the vehicle wheel which is provided for the balancing operation, the radial spacing of the holding means from the central recess and the mutual circumferential spacing of the holding means can be fixed in the desired position by means of the fixing device. This can take place, for example, when the holding device has not yet been placed onto the shaft of the balancing machine. It is possible in this context to set the circumferential spacing of the holding means to the pitch circle diameter of the rim, while the vehicle wheel lies on the floor. Here, the holding device according to the invention can be pressed simply onto the rim from above, the holding means being set readily to the pitch circle diameter of the rim. In this context, the holding means can be self-setting. This presupposes an easy adjustability of the holding means in the non-fixed state. As a result, the setting operation of the holding device is simplified. After the holding means have been fixed in the desired position by means of the fixing device, the rim of the vehicle wheel and the holding device can subsequently be pushed onto the shaft of the balancing machine and the rim can be clamped between the holding device and the bearing flange of the shaft. As a result of the fixing of the holding elements and therefore of the holding means, an undesired displacement of the holding means can no longer occur after the rim and the holding device have been pushed onto the shaft. As a result, it can be ensured that the rim is pressed against the bearing flange of the shaft in the desired position by all the holding means.

It goes without saying that the invention is not restricted to those devices which are provided for pressing the rim against a bearing flange of a shaft of a balancing machine. The invention can also be realized in a holding device which has a base plate to which the rim is screwed, it being possible for the holding means to be configured as threaded bolts.

The further coupling means can be formed by a frictional connection between at least one circumferential face of the holding element and at least one circumferential face of the coupling element. As a result, any play at all in the rotational movement of the holding elements can be precluded in a simple manner and with low construction expenditure. In this context, there can be provision for at least one friction means to be arranged between the circumferential face of the holding element and the circumferential face of the coupling element, for example a pad made from plastic, preferably from rubber.

If the holding element is configured as a satellite gear and the coupling element is configured as a preferably annular sun gear and they form a planetary gear mechanism, the positive coupling means can be formed in a simple manner by toothed rims of the holding element and the coupling element which mesh with one another. The toothed rim of the holding element and/or the toothed rim of the coupling element can have at least one circumferential groove, it being possible, in order to form a frictional connection between the holding element and the coupling element, for at least one friction means to be embedded into the circumferential groove of the holding element and/or into the circumferential groove of the coupling element. The circumferential grooves are preferably arranged such that they lie opposite one another.

The friction means can be an O-ring made from plastic or rubber which is embedded partially into the circumferential groove of the holding element and/or the coupling element. Friction means of the abovementioned type are available in a very wide range of embodiments and are inexpensive. Moreover, they can be pulled onto the holding element and/or the coupling element in a simple manner.

There is provision in one preferred embodiment of the invention for the fixing device to have a fixing element having at least one fixing means for fixing the coupling element in a frictional or positive manner. After the fixing of the coupling element, a rotational movement of the coupling element is no longer possible. This ensures reliable fixing of the holding elements or the holding means in a desired pressing or holding position, the holding means being set to a required pitch circle diameter of the rim holes.

In order to fix the coupling element in a simple manner and therefore in order to prevent firstly a further rotational movement of the holding elements and a displacement of the radial spacing of the holding means from the central recess and secondly a displacement of the mutual circumferential spacing of the holding means, there can be provision for the fixing element to be arranged such that it can be adjusted coaxially with respect to the coupling element and in the axial direction relative to the coupling element. Here, the fixing device is configured in such a way that, by the adjustment of the fixing element, the coupling element can be loaded via the fixing means with a holding force which is sufficient for fixing. The holding force has to be sufficiently great in order for it to be possible to preclude a displacement of the coupling element.

In conjunction with the axial adjustability of the fixing element, there can be provision for at least one stop face for an end side of the coupling element to be provided on the base plate, and for the coupling element to be pressed against the stop face by adjustment of the fixing element.

The toothed rim of a holding element or all holding elements can protrude beyond the outer edge of the base plate in regions and form an actuating section for the coupled rotation of the holding elements. The protruding sections of the toothed rim can be gripped safely with a finger, in order for it thus to be possible to adjust the holding elements for setting the holding means to the pitch circle diameter of the fastening holes of a rim in a simple manner and without further aids.

A pressure bolt which is arranged eccentrically with respect to the rotational axis of the holding element and has a bold root and a bolt head can be provided as holding means, it being possible for the bolt head to be connected to the bolt root in a spring-loaded and preferably releasable manner. Here, different head shapes of the bolt heads can be provided for different rims. In the case of a spring-loaded bolt head, compensation of manufacturing tolerances is possible.

In detail, there are a multiplicity of possibilities for configuring and developing the clamping device according to the invention, reference being made firstly to the dependent patent claims and secondly to the following detailed description of one preferred exemplary embodiment of the invention with reference to the drawing, in which:

DETAILED DESCRIPTION OF THE INVENTION

Figure 1:
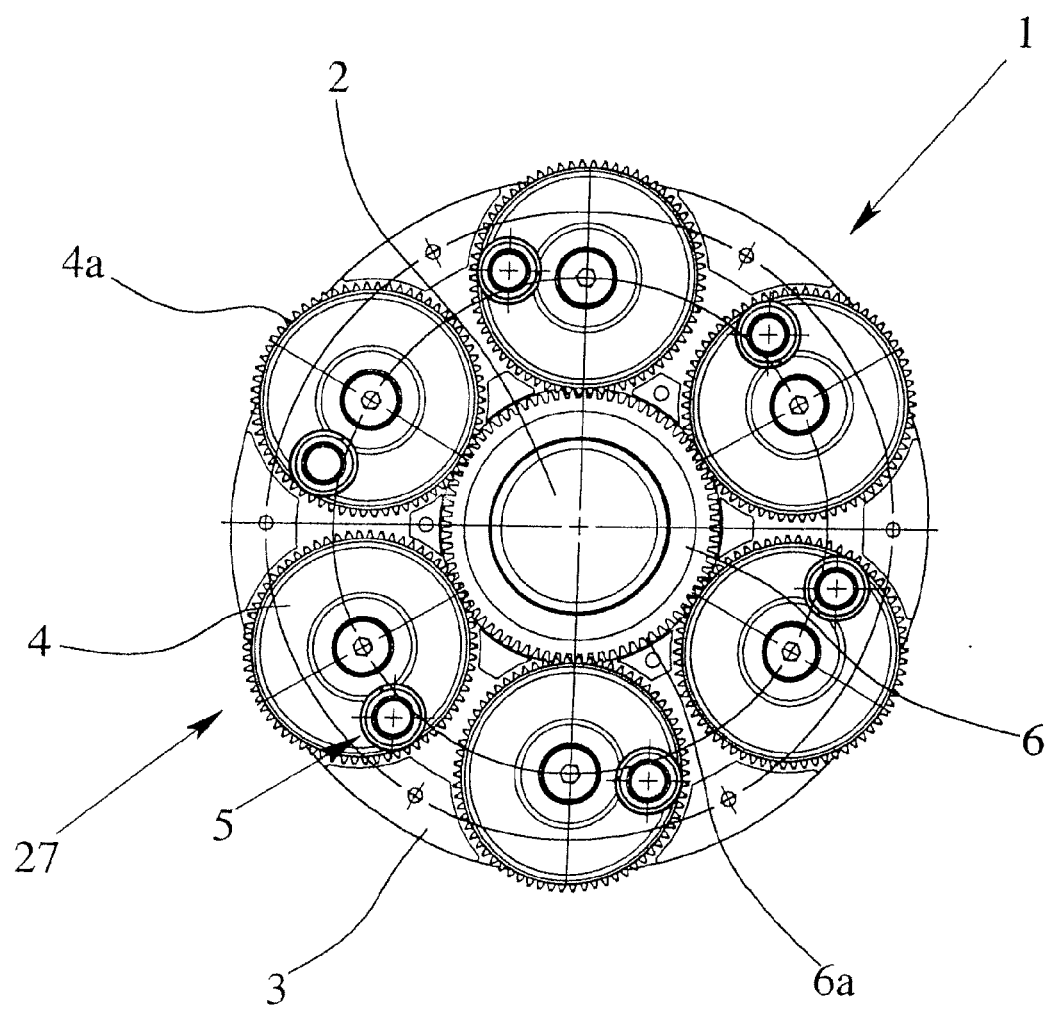
FIG. 1 shows an embodiment of a holding device according to the invention for a rim of a vehicle wheel, in a plan view.

FIG. 1 shows a holding device 1 for a rim (not shown) of a vehicle wheel. The holding device 1 has a base plate 3 which has a central recess 2 for being pushed onto a shaft of a balancing machine (not shown). In order to press the rim onto a bearing flange of the shaft of the balancing machine, a plurality of holding elements 4 are provided which are arranged at a uniform mutual circumferential spacing and at a uniform radial spacing from the central recess 2 and are mounted rotatably on the base plate 3, each holding element 4 having a holding means. Eccentrically mounted pressure bolts 5 are provided as holding means. The holding elements 4 are formed as disk-shaped satellite gears. In principle, the holding elements can also have a non-circular shape. A coupling element 6 which is configured as a sun gear is provided for the positive coupling of the rotational movement of the holding elements 4, toothed rims 4*a*, 6*a* of the holding elements 4 and the coupling element 6 which mesh with one another forming coupling means of a planetary gear mechanism. The holding element 4 has the toothed rim 4*a* on its circumference and the coupling element 6 has the toothed rim 6*a* on its circumference.

Figure 2:
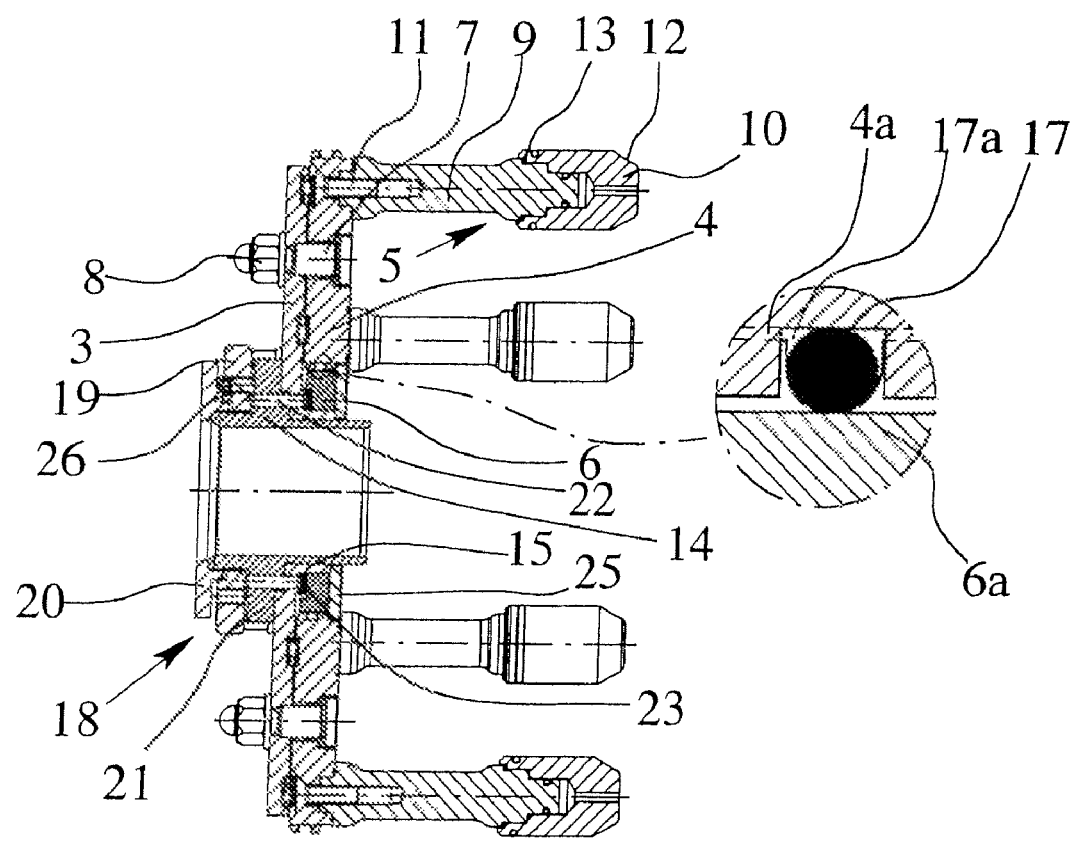
FIG. 2 shows the holding device which is shown in FIG. 1, in a cross-sectional view from the side.

According to FIG. 2, the holding element 4 is held on the base plate 3 by means of a rotary bearing which is formed substantially by a threaded bolt 7 which is fastened to the base plate 3 by means of a cap nut 8. The pressure bolt 5 which has a bolt root 9 and a bolt head 10 is fastened to the holding element 4 by means of a screw 11. The bolt head 10 has a front face 12 which serves for latching in a centered manner into a fastening hole of a rim which is shaped in a complementary manner. Moreover, a zigzag spring 13 is provided which bears against a circumferential shoulder of the bolt root 9 and acts against the bolt head 10 which is placed onto the bolt root 9. Manufacturing tolerances can be compensated for by the spring loading of the bolt head 10. Otherwise, the bolt head 10 is connected releasably to the bolt root 9. This makes it possible to connect bolt heads 10 of different configuration to the bolt root 9 as a function of the geometry of the fastening hole of the rim.

Figure 3:
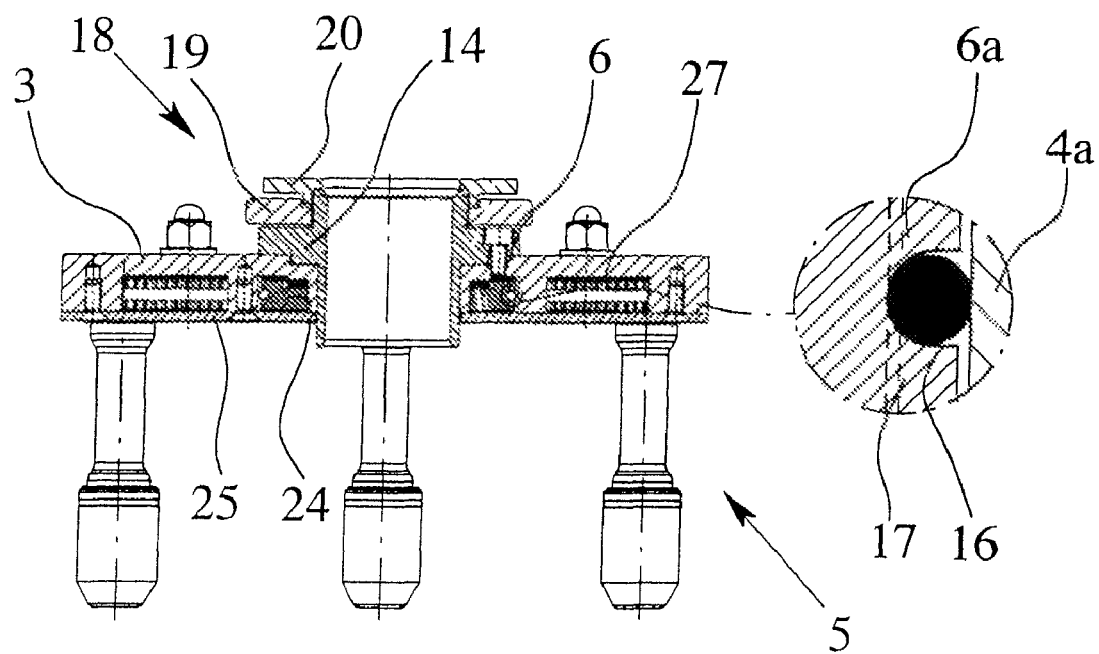
FIG. 3 shows a further cross-sectional view of the holding device which is shown in FIG. 1, from the side.

The central recess 2 is not formed directly in the base plate 3, but in a bush 14 which is pressed into a corresponding recess of the base plate 3. The coupling element 6 is mounted rotatably on an annular projection 15 of the base plate 3. The toothed rim 6*a* of the coupling element 6 has a groove 16 which is shown in FIG. 3 and into which an O-ring 17 is embedded as friction means.

Lying opposite the groove 16 of the toothed rim 6*a* of the coupling element 6, the toothed rim 4*a* of the holding element 4 has a circumferential groove 17*a*, against which the O-ring 17 bears frictionally in the region of the meshing toothed rims 4*a*, 6*a*. This provides frictional coupling between the holding elements 4 and the coupling element 6, by which frictional coupling any play at all is precluded in the coupled rotational movement of the holding elements 4.

Moreover, the holding device 1 has a fixing device 18 for fixing the coupling element 6 frictionally. As fixing element, the fixing device has a knurled nut 19 which is arranged such that it can be adjusted in the axial direction of the holding device 1 relative to the coupling element 6 between a pressure ring 20 which is pressed onto the bush 14 on the end side and a flange 21 of the bush 14. The knurled nut 19 is screwed onto an external thread of the bush 14 and is arranged coaxially with respect to the coupling element 6. When the knurled nut 19 is screwed on, fixing means, in the present case cylinder pins 22 which are arranged such that they can be displaced in the axial direction in a through hole of the bush 14 and the base plate 3, are displaced in the direction of a disk-shaped ring element 23, the ring element 23 being embedded into a recess of the coupling element 6. By adjustment of the knurled nut 19, a pressing or holding force is exerted on the coupling element 6 via the cylinder pins 22, as a result of which said coupling element 6 is pressed against a stop face 24 of a housing cover 25. A spacer disk can be provided between the coupling element 6 and the housing cover 25, with the result that, during adjustment of the knurled nut 19, the coupling element 6 is adjusted against the spacer disk, the spacer disk bearing against the stop face 24 of the housing cover 25. The spacer disk can be embedded in a flush manner into a groove on the end side of the coupling element 6, with the result that, during adjustment of the knurled nut 19, there is substantially full surface-area contact of the coupling element 6 and the spacer disk against the stop face 24 of the housing cover 25. As a result, the contact pressure which is required for frictional fixing of the coupling element 6 can be distributed uniformly over the end face of the coupling element 6. The spacer disk is otherwise of advantage when the coupling element 6 is produced from a plastic. In the case of sufficient adjustment of the knurled nut 19, frictional fixing of the coupling element 6 occurs, as a result of which the holding elements 4 and therefore the pressure bolts 5 are fixed at a defined radial spacing from the central recess 2 and at a defined mutual circumferential spacing. The adjusting travel of the knurled nut 19 is limited by threaded pins 26. If the knurled nut 19 has been screwed sufficiently far away from the bush 14 or is spaced apart from the flange 21 of the bush 14, the coupling element 6 is released and is mounted rotatably on the projection 15 of the base plate 3.

When the exemplary embodiment which is shown is used, all the holding elements 4 are rotated by actuation of an actuating section 27 of a holding element 4 before or after the base plate 3 has been pushed onto the shaft of the balancing machine. On account firstly of the frictional connection between the O-ring 17 which is inserted into the groove 16 of the coupling element 6 and interacts with the groove 17a of the holding element 4 and secondly as a result of the toothed rims 4a, 6a which mesh with one another, coupled rotation of the holding elements 4 is possible which is largely without play, without it being necessary for slipping of the O-ring to be feared during the rotational movement. All the pressure bolts 5 are moved to the same extent, in order thus to change their mutual and radial position in relation to the central recess 2 and to adapt it to the corresponding position of the fastening holes of a rim of a wheel which is to be balanced. Any displacements of the frictional connection between the O-ring 17 and the opposite groove 17a of the holding element 4 which occur are compensated for by the toothed rims 4a, 6a which mesh with one another. Moreover, the meshing toothed rims 4a, 6a preclude a situation where slipping and release of the frictional connection can occur. The actuating section 27 is formed by a section of the toothed rim 4a of the holding element 4, which section protrudes beyond the outer edge of the base plate 3 in regions. Here, in the exemplary embodiment which is shown, each holding element 4 has an actuating section 27, with the result that the radial and the circumferential spacing of the pressure bolts 5 can be adjusted by actuation of an actuating section 27 of any desired holding element 4. As a result, the presetting of the pressure bolts 5 to a pitch circle diameter of fastening holes of a rim is simplified substantially.

What is claimed is:

1. A holding device for a rim of a vehicle wheel, comprising:
    a base plate which has a central recess for being pushed onto the shaft of a balancing machine,
    a plurality of rotatably mounted holding elements, each holding element having a holding means for the rim, and
    at least one coupling element which is arranged coaxially with respect to the central recess and is mounted rotatably on the base plate,
    wherein the holding elements and the coupling element having interacting coupling means for the positive coupling of rotational movement of the holding elements,
    wherein in addition to the coupling means which bring about said positive connection, the holding elements and the coupling element have a frictional coupling means for frictionally coupling of the rotational movement of the holding elements,
    wherein at least one fixing device is provided which is arranged so as to enable selective fixing of the position of the holding elements in a manner preventing rotational movement of the holding elements, and
    wherein the fixing device has a fixing element that is arranged so as to be adjustable coaxially with respect to the coupling element, and wherein the fixing device is configured in such a way that, by the adjustment of the fixing means, the coupling element is directly loaded via the fixing element with a holding force which is sufficient for said fixing of the position of the holding elements.

2. The holding device as claimed in claim 1, wherein the frictional coupling means comprise a frictional connection between at least one circumferential face of the holding elements and at least one circumferential face of the at least one coupling element.

3. The holding device as claimed in claim 1, wherein at least one friction means is arranged between a circumferential face of the holding element and a circumferential face of the coupling element.

4. The holding device as claimed in claim 1, wherein the at least one holding element is configured as a satellite gear and the at least one coupling element is configured as a sun gear so as to form a planetary gear mechanism, the interacting coupling means being formed by toothed rims of the at least one holding element and the at least one coupling element which mesh with one another.

5. The holding device as claimed in claim 4, wherein the toothed rim of the at least one coupling element has at least one circumferential groove, and wherein, in order to form a frictional connection between the holding element and the coupling element, at least one friction means is embedded into the circumferential groove of the coupling element.

6. The holding device as claimed in claim 5, wherein said friction means is an O-ring.

7. The holding device as claimed in claim 5, wherein the toothed rim of the at least one holding element has at least one circumferential groove, and wherein, in order to form a frictional connection between the holding element and the coupling element, at least one friction means is embedded into the at least one circumferential groove of the holding element.

8. The holding device as claimed in claim 5, wherein said friction means is an O-ring.

9. The holding device as claimed in claim 1, wherein the toothed rim of the at least one holding element has at least one circumferential groove, and wherein, in order to form a frictional connection between the holding element and the coupling element, at least one friction means is embedded into the at least one circumferential groove of the holding element.

10. The holding device as claimed in claim 9, wherein said friction means is an O-ring.

11. The holding device as claimed in preceding claim 9, wherein the toothed rim of the holding element protrudes beyond an outer edge of the base plate in regions and forms an actuating section for coupled rotation of the holding elements.

12. The holding device as claimed in preceding claim 9, wherein the toothed rim of the holding element protrudes beyond an outer edge of the base plate in regions and forms an actuating section for coupled rotation of the holding elements.

13. The holding device as claimed in claim 1, wherein the fixing device has a fixing element having at least one fixing means for fixing the coupling element in a positive manner.

14. The holding device as claimed in claim 13, wherein at least one stop face for an end side of the coupling element is provided on the base plate, and wherein the coupling element is adapted to be pressed against the stop face during fixing by the fixing means.

15. The holding device as claimed in claim 1, wherein the holding means comprises a pressure bolt, wherein the pressure bolt is arranged eccentrically with respect to the rotational axis of the holding element and has a bolt root and a bolt head, and wherein the bolt head is connected to the bolt root in a spring-loaded manner.

16. The holding device as claimed in claim 1, wherein the holding elements have a circular shape, wherein the holding means of each of the holding elements is mounted radially inward of the periphery of the respective holding element and is arranged eccentrically with respect to the rotational axis of the respective holding element, and wherein the rotational axis of each holding element is located in the center thereof.

17. A holding device for a rim of a vehicle wheel, comprising:
- a base plate which has a central recess for being pushed onto the shaft of a balancing machine,
- a plurality of rotatably mounted holding elements, each holding element having a respective holding means for the rim, and
- at least one coupling element which is arranged coaxially with respect to the central recess and is mounted rotatably on the base plate,
- wherein the holding elements and the coupling element having interacting coupling means for the positive coupling of rotational movement of each of the holding elements about a respective rotational axis,
- wherein, in addition to the coupling means which bring about said positive connection, the holding elements and the coupling element have a frictional coupling means for frictionally coupling of the rotational movement of the holding elements,
- wherein at least one fixing device is provided for selective fixing of the position of the holding elements to prevent rotational movement of the holding elements,
- wherein the fixing device has a knurled nut having at least one fixing means for fixing the coupling element in a frictional manner via an 0-ring, wherein knurled nut is arranged so that it is adjustable coaxially with respect to the coupling element and in the axial direction relative to the coupling element, and
- wherein the fixing device is configured in such a way that, by adjustment of the fixing means, the coupling element is directly loaded via the knurled nut with a holding force which is sufficient for fixing of the position of the holding elements.

18. The holding device as claimed in claim 17, wherein the frictional coupling means comprise a frictional connection between at least one circumferential face of the holding elements and at least one circumferential face of the at least one coupling element.

19. The holding device as claimed in claim 17, wherein at least one friction means is arranged between a circumferential face of the holding element and a circumferential face of the coupling element.

20. The holding device as claimed in claim 17, wherein the at least one holding element is configured as a satellite gear and the at least one coupling element is configured as a sun gear so as to form a planetary gear mechanism, the interacting coupling means being formed by toothed rims of the at least one holding element and the at least one coupling element which mesh with one another.

21. The holding device as claimed in claim 20, wherein the toothed rim of the at least one coupling element has at least one circumferential groove, and wherein, in order to form a frictional connection between the holding element and the coupling element, at least one friction means is embedded into the circumferential groove of the coupling element.

22. The holding device as claimed in claim 21, wherein said friction means is an O-ring.

23. The holding device as claimed in claim 21, wherein the toothed rim of the at least one holding element has at least one circumferential groove, and wherein, in order to form a frictional connection between the holding element and the coupling element, at least one friction means is embedded into the at least one circumferential groove of the holding element.

24. The holding device as claimed in claim 21, wherein said friction means is an O-ring.

25. The holding device as claimed in claim 17, wherein the toothed rim of the at least one holding element has at least one circumferential groove, and wherein, in order to form a frictional connection between the holding element and the coupling element, at least one friction means is embedded into the at least one circumferential groove of the holding element.

26. The holding device as claimed in claim 25, wherein said friction means is an O-ring.

27. The holding device as claimed in claim 17, wherein the fixing device has a fixing element having at least one fixing means for fixing the coupling element in a positive manner.

28. The holding device as claimed in claim 27, wherein at least one stop face for an end side of the coupling element is provided on the base plate, and wherein the coupling element is adapted to be pressed against the stop face during fixing by the fixing means.

29. The holding device as claimed in claim 17, wherein the holding means comprises a pressure bolt, wherein the pressure bolt is arranged eccentrically with respect to the rotational axis of the holding element and has a bolt root and a bolt head, and wherein the bolt head is connected to the bolt root in a spring-loaded manner.

30. The holding device as claimed 17, wherein the holding elements have a circular shape, wherein the holding means of each of the holding elements is mounted radially inward of the periphery of the respective holding element and is arranged eccentrically with respect to the rotational axis of the respective holding element, and wherein the rotational axis of each holding element is located in the center thereof.

* * * * *